United States Patent [19]

Agarwala

[11] Patent Number: 4,542,033

[45] Date of Patent: Sep. 17, 1985

[54] SUGAR AND ACID INFUSED FRUIT PRODUCTS AND PROCESS THEREFOR

[76] Inventor: Om P. Agarwala, 536 - 17th Ave. NW., New Brighton, Minn. 55112

[21] Appl. No.: 663,744

[22] Filed: Oct. 23, 1984

Related U.S. Application Data

[63] Continuation-in-part of Ser. No. 469,189, Feb. 24, 1983, abandoned.

[51] Int. Cl.$^4$ ............... A23B 7/10; A23B 7/03; A23B 7/02; A23L 3/34
[52] U.S. Cl. ................... 426/321; 426/577; 426/615; 426/620; 426/639; 426/640
[58] Field of Search .............. 426/102, 103, 615, 620, 426/639, 640, 321, 577, 442, 464, 100

[56] References Cited

U.S. PATENT DOCUMENTS

| | | |
|---|---|---|
| 2,651,575 | 9/1953 | Talburt et al. |
| 3,365,309 | 1/1968 | Pader et al. |
| 3,453,118 | 7/1969 | Jobin |
| 3,800,049 | 3/1974 | Larroche et al. |
| 3,833,747 | 9/1974 | Cording et al. |
| 3,892,870 | 7/1975 | Wood |
| 3,952,112 | 4/1976 | Fulger et al. |
| 4,055,675 | 10/1977 | Popper et al. |
| 4,103,035 | 7/1978 | Fulger et al. |
| 4,256,772 | 3/1981 | Shanbhag et al. |
| 4,355,050 | 10/1982 | Butland |
| 4,361,589 | 11/1982 | Wauters et al. |
| 4,390,550 | 6/1983 | Kahn et al. |

*Primary Examiner*—Raymond N. Jones
*Assistant Examiner*—Elizabeth C. Weimar

[57] ABSTRACT

Disclosed are processes for preparing shelf stable fruit pieces. The process comprises the steps of (a) providing fresh fruit pieces; (b) deactivating or retarding enzymatic browning; (c) cooking in an acidified sugars syrup; optionally (d) cooling and draining; (e) sulfiting; and (f) dehydrating. The fruit pieces so prepared are soft in texture, even when dried to low $A_w$'s, and can be used in R-T-E cereals or as snack items per se.

21 Claims, No Drawings

SUGAR AND ACID INFUSED FRUIT PRODUCTS AND PROCESS THEREFOR

CROSS-REFERENCE TO RELATED APPLICATION

This application is a continuation-in-part application of U.S. Ser. No. 469,189 filed Feb. 24, 1983, now abandoned.

BACKGROUND OF THE INVENTION

1. Field of the Invention

This invention relates to food products and to their methods of preparation. More particularly, the invention is directed to fruit products, particularly dehydrated, to cereal products containing such fruit products, particularly R-T-E dry breakfast cereals, and to the methods of preparing such products.

2. The Prior Art

Fruit and fruit products enjoy widespread consumer appeal due in part to the wholesomeness and organoleptic attributes of fruit. However, due to the limited shelf life of fruits, efforts from time immemorial have been made to extend the storage of fruits, including, for example, canning, freezing and drying.

Drying long has been the most common technique to prepare fruit products which do not require special packages or storage conditions. Dehydrated fruit products such as apples, raisins, prunes, and the like are popular snack items. Also, the combination of fruit and dry, ready-to-eat ("R-T-E") cereal has significant consumer appeal. Although enjoying some consumer acceptance, food products, particularly R-T-E cereals, containing dried fruit products face problems inherent in combining diverse, dried food materials.

For example, for a stable, crisp, R-T-E cereal, the moisture content is reduced so that the water activity ("$A_w$") ranges between 0.2 to 0.4 typically to levels of 1-4%. Fruit conventionally dehydrated to comparable water activity levels are usually hard and/or very tough in texture and fibrous in structure and thus unsuitable for combining with the cereals. Moreover, the flavor progressively deteriorates with greater drying. If, however, fruit pieces are only dried to higher $A_w$'s so as to retain desirable texture and flavor eating qualities, then they will either not be bacteriologically stable at room temperatures, or when admixed with the dry cereal, will tend over time to lose moisture to the relatively drier cereal and thus cause the cereal to become less crisp or soggy and the fruit to become again hard, dry and excessively tough.

A wide variety of methods are used or have been suggested for use to provide shelf stable fruit or fruit products suitable for incorporation into R-T-E cereal products. Generally, one or more of three basic approaches have been taken. One basic approach has been made to attempt to modify the texture of low water activity fruits. For example, in U.S. Pat. No. 3,453,118 (issued July 1, 1969 to Jobin) low moisture raisins are treated with either acidic or basic baths for brief periods to maintain softness. Post dehydration treatment tends, however, to result in loss of product identity.

A second basic approach has been to dry fruits only partially to maintain good flavor and texture while treating the fruit pieces to enhance either bacterial stability and/or to bind the higher moisture content so as to lower water activity by infusion of sugars and/or humectants, e.g., polyol. For example, U.S. Pat. No. 4,256,772 (issued Mar. 17, 1981 to Shanbhag and Szczesniak) wherein fruits are infused with polyols and sucrose. U.S. Pat. No. 3,952,112 (issued Apr. 20, 1976 to Fulger) discloses processing to increase humectant absorbtion. For certain fruits, i.e., grapes, having an intact skin, an acid treatment step prior to infusion to open the skin to infusion has been taught (see U.S. Pat. No. 4,103,035, issued July 25, 1978 to Fulger et al.).

A third basic approach is to radically restructure the dried fruit piece to improve texture. U.S. Pat. No. 4,055,675 (issued Oct. 25, 1977 to Popper et al.) discloses processes for preparing puffed raisins. U.S. Pat. No. 3,833,747 (issued Sept. 3, 1974 to Cording and Eskew) also discloses processes for preparing puffed dried fruit. U.S. Pat. No. 3,315,619 (issued Apr. 25, 1967 to Slaybaugh) discloses a simulated fruit product comprising fruit puree and structured with starch and gums.

All of these approaches of the prior art attempt to overcome one or more of the deficiencies in stability, texture, flavor and/or color in dried fruits and claim improvements in one or more of these properties. The sheer variety and number of approaches taken each suggest the difficulty in preparing shelf stable dried fruit product having an overall improvement in these properties. Notwithstanding the claimed benefits of the prior art attempts, there is a continuing need for new and useful processes for the preparation of high quality dried fruit.

The present invention thus surprisingly provides improved dried fruit products, an improved process for preparing shelf stable fruit, and R-T-E cereals containing such fruit. The present process provides fruit pieces of soft texture at low $A_w$ with improved natural flavor but without having objectionable off-flavors due to addition of humectants. The present fruit piece products surprisingly are readily recognizable from both visible and flavor standpoints as shelf stable pieces of the fruits from which they are derived and thus do not exhibit loss of product identity. Moreover, the texture improvement advantages are realized without requiring radical restructuring of the dried fruit piece. Indeed the most dramatic improvements in product attributes provided by the present fruit products compared to prior art is in texture or "bite." In certain preferred embodiments, shelf stable fruit pieces are provided without any additives and thus are stylized as being "all-natural."

SUMMARY OF THE INVENTION

The present invention relates to processes for providing shelf stable fruit pieces having improved flavor and texture and which are particularly suitable for incorporation into R-T-E cereals. The process comprises a first step of (a) providing pieces of fresh fruit; (b) deactivating or retarding the enzymatic browning in case of fruits with active polyphendoxidase (ppo) enzymes; (c) cooking the fruit pieces in a sugar(s) syrup at a pH of about 3.75 to 1.5. The syrup desirably has a solids concentration of from about 30% to about 90%. Optionally, the syrup can comprise about 0.1% to 30% of a polyhydric alcohol. The cooking step is practiced at a temperature of from about 140° F. to 200° F. (60° C. to 93° C.) for about 10 to 60 minutes. Thereafter, in certain embodiments of the present invention, the fruit pieces are drained and allowed to cool. The cooled pieces can then be dried to desired moisture contents or $A_w$.

In its product aspect, the present invention relates to intermediate acid hydrolyzed sugar infused fruit pieces and also to the shelf stable fruit pieces realized by the present processes. Also, the present invention relates to R-T-E cereals comprising from about 1% to about 50% of the shelf stable fruit pieces and conventional cereal pieces.

DETAILED DESCRIPTION OF THE INVENTION

The present invention relates to shelf stable fruit pieces, to methods for the preparation of such shelf stable fruit pieces, and to R-T-E cereals containing such fruit pieces. Each of the method steps as well as product use are described in detail below.

Throughout the specification and claims percentages are by weight and temperatures in degrees Fahrenheit unless otherwise specified.

A. Providing Fruit Pieces

The present invention is especially suitable for use in connection with all types of fresh fruit. Although useful herein, previously frozen fruits or canned fruit are less desirable. Preferred for use herein are those fruits which are high in pectin content. Although useful, less preferred for use herein are those fruits having high levels of fruit juices such as tomatoes or strawberries and citrus fruits. Exemplary preferred fruits for use herein include apples, pears, cherries, apricots, pineapple, peaches, plums, and the like. Both peeled and unpeeled fruit pieces are useful. The fruit pieces can be in any shape or form such as slices or diced or otherwise shaped. Preferred for use are diced fruit, e.g., apx. 1–3 cm. weighing 0.5 to 10 g., although both larger or smaller pieces can also be used. Of course, mixtures of fruit can also be prepared together herein if desired.

B. Enzyme Inactivation

After the fruit has been formed into pieces, it is important to inactivate or at least substantially retard the fruit's enzymes to prevent browning if the fruit pieces are not immediately subjected to the present cooking step for those fruits having active ppo enzymes. Of course, when canned fruits are used as the fruit source, the enzymes have been previously inactivated by the previous canning operation. Even through the enzymes are inactivated at the end of the subsequent cooking period at low temperature cooking, the first few minutes after slicing, dicing, etc. can cause browning in fruits with active ppo. Conventional techniques such as blanching, sulfiting, or cooking in ascorbic acid bath are useful for this step. Of course, combinations of these techniques can be used. Blanching is preferred for use herein in realizing finished fruit products since the products are characterized by the absence of additive materials and are thus referred to as "all-natural". Blanching can be practiced by immersing the fruit pieces in a boiling water bath for about 30 seconds to 5 minutes.

Sulfur dioxide as well as sulfurous acid salts or other treating agents supplying a $SO_2$ moiety are commonly added to foods for preservation purposes including dried fruit. This process is known by several terms including sulfuring or sulfurization, sulfitization or, most commonly, sulfiting. If sulfiting is to be used for enzyme inactivation, then the fruit pieces can be immersed into a water bath containing conventional sulfiting agents (e.g., sodium bisulfite, sulfur dioxide, sodium sulfite, sodium metabisulfite, potassium bisulfite, potassium metabisulfite, and mixtures thereof) for a time sufficient to provide a sulfite content of from about 30 to 3,000 parts per million. Typical water bath sulfite concentrations range from about 0.1% to 2% while immersion times typically range from about 10 seconds to 10 minutes. Bath temperature is not critical and typical temperatures range from about 60° F. to 185° F. (15° C. to 85° C.).

Enzymatic browning can be retarded by dipping fruits at room temperature in a bath containing 0.1% ascorbic acid and/or 0.1% to 2% citric acid. Ascorbic acid can also be combined with sulfur dioxide with an advantage to reduce levels of sulfur dioxide conventionally required in the final product. It is known that ascorbic acid inhibits browning by sequestering oxygen present in and around the fruit tissue.

C. Cooking

Another important step in the present process is to cook the fruit pieces in sugar(s) syrups of controlled pH and temperature for controlled times. While not wishing to be bound by the proposed theory, it is speculated herein that the present process results in selectively breaking down the insoluble protopectins to soluble pectins. Concurrently, the semipermeability of the cell membranes is lost and a large amount of soluble sugars and acid is infused into the individual cells. During cooling the soluble pectin-sugar-acid-water form a three dimensional gel network in the inter- and intracellular spaces. The formation of such gels prevent collapse of the fruit cell structure upon subsequent dehydration and the concommitant development of a tough, leathery texture characteristic of the inferior product of the prior art, and are responsible for the firm and yet clean "bite" of the present products.

Sugar(s) selection is not critical and the sugar(s) syrup can be prepared using any conventional nutritive carbohydrate sweetening agent including both mono- and disaccharides such as sucrose, invert sugar, dextrose, corn syrup including high fructose corn syrup, maltose, honey, fructose, corn syrup solids and fruit juices. Preferred sugars are selected from the group consisting of sucrose, corn syrup, fructose, fruit juice and mixtures thereof. Where cost is a primary consideration, sucrose is the sugar of choice. If flavor quality is of paramount concern, then fruit juices or juice powders are the sugar of choice. The solids concentration should be at least about 30%. Upper operable concentrations are limited only by handling considerations. Generally, however, upper practical concentrations will be about 90%. For better results in terms of final product attributes, the solids content desirably ranges from about 50% to 70%. For best results, about 60% is preferred. The syrup can be supplied in whole or in part from single or multiple strength fruit juices of one or more types or even juice powders whether the same or different from the fruits being treated.

It is most important to control the pH of the mixture of fruit pieces and syrup. The pH of fresh fruits typically ranges from about 4.0 to 4.5. The pH of the syrup, however, should be less than about 3.8. The pH can be as low as about 1.5. Preferably, the pH ranges from about 2 to 3.6. For best results the pH is about 3.2. The pH can be adjusted by adding sufficient amounts of any food grade acidulant including both edible organic acids and mineral acids as well as fruit juices, and mixtures thereof. Suitable edible organic acids include, for example, citric, malic, adipic, fumeric, and mixtures thereof. Exemplary mineral acids include phosphoric, hydrochloric and sulfuric acids. Exemplary acidifying fruit juices include, lemon juice, lime juice, vinegar, apple cider, and mixtures thereof.

Optionally, the cooking syrup may contain adjuvants which are desired to be infused into the fruit pieces. Such adjuvants may include, for example, minor amounts (0.1 to 2%) flavors, and colors. The syrup may also contain greater amounts of a variety of edible polyhydric alcohols. These same materials are also sometimes referred to in the art as "hydrogenated glucose syrups." The infusion of polyols for texture control, moisture simulation and water activity reduction is well known. (Generally, see for example, U.S. Pat. No. 3,769,042, issued Oct. 30, 1973 to Kaplow et al. and for infusion of fruits, U.S. Pat. No. 4,256,772, issued Mar. 17, 1981 to Shambhag et al., each of which is included herein by reference.) Exemplary suitable polyols include sorbitol, mannitol, glycerol, propylene glycol and mixtures thereof. Glycerol is the preferred polyol. If present, the polyol can comprise about 0.1 to 30%, preferably 15 to 25% of the syrup. Surprisingly, the polyhydric alcohols can be simultaneously infused with the sugars without adversely affecting the effects of the pH or the sugars.

The temperature of the syrup ranges from about 120° F. (49° C.) to 200° F. (93° C.). Preferably, the temperature ranges from about 140° F. (60° C.) to 185° F. (85° C.). For best results the temperature is about 165° F. (74° C.). The time which the fruit pieces is treated is dependent upon the several interdependent variables such as temperature, the pH, and the desired end product attributes. Shorter times are used with higher temperatures, lower pH, and when more firm textures are desired and when less sugar(s) infusion is desired.

During the cooking step, in addition to in situ acid hydrolysis of insoluble pectins, the sugars from the sugar, syrup infuse the cells of the fruits. While the weight ratio of syrup to fruit pieces is not critical, the syrup must contain initially, or supplemented during cooking, to supply sufficient sugar(s) solids to infuse the fruit pieces. Fruits typically contain about 85% moisture and 15% total solids. After the cooking step, the solids content is raised to about 40–60% due to some water loss and the sugar(s) infusion.

Optionally, the texture can be modified by manipulating the calcium ion-soluble pectin interaction. Should more firm textures be desired, additional calcium than naturally present can be introduced by simply adding small amounts of calcium salts sufficient to provide a calcium ion concentration of from about 100 to 1,000 ppm in the fruit pieces, e.g., calcium chloride, phosphate and/or oxide. Conversely, should a less firm texture be desired in the finished product, the naturally present calcium can be chelated by introducing such chelating agents as sodium oxylate, citric acid or ethylene diamine tetra acetic acid, e.g., of from about 100 to 1,000 ppm in the fruit pieces.

D. Cooling to Below the Gelling Point

The infused fruit pieces are removed from the sugar syrup and allowed to drain and cool. It is desirable to cool the fruit pieces to below the gelling point of the pectin gel formed within and between the cells of the fruit to set the gel. The gelling point is influenced by several factors including the concentration of sugars, pH, water-soluble pectin content and the esterification of pectins.

In general, however, the gelling points of the fruit products prepared by the present invention range from about 110° F. to 150° F. (43° C. to 65° C.). Accordingly, the fruit pieces can be conveniently cooled to below the gelling point in all cases by coming to room temperature (65° F., 18° C.). If desired, cooling can be accelerated by any conventional means, e.g., immersion into cold water baths or forced cool air convection cooling. While less desirable, the fruit pieces can be cooled without first removing from the syrup and draining by simply cooling both the syrup and fruit pieces. Also, if desired, the cooling step can be combined with the subsequently described dehydration step such as by cooling with forced air drying at an air temperature below the gelling temperature.

E. Sulfiting

An optional step (but desirable in preferred embodiments of the present process) after cooling the fruit pieces is to treat with a sulfiting agent to inhibit non-enzymatic browning. Enzymatic browning is effectively inhibited by the cooking step even if an enzymatic inhibition step had not been previously employed. Post cooling sulfiting is a preferred step even when a precooking sulfiting step is practiced due to the sulfite loss resulting from the cooking step. Conventional materials and concentrations are used and processing can be used for the enzyme inactivation as described above.

If an "all-natural" product is desired, the post cooking sulfiting step can be eliminated and non-enzymatic browning can be inhibited by increasing the sugars content combined with ascorbic acid and dehydrating to lower moisture contents and/or by distributing at refrigerated/freezer temperatures.

The intermediate fruit pieces prepared by these steps can be used in a variety of applications. For those embodiments which have been infused with sugars of up to about 60–65% combined with low pH are shelf stable and require no further processing. Other embodiments having less than about 60% sugars require either refrigerated or frozen storage. However, these intermediate products do not hard freeze at these temperatures since the moisture is sufficiently bound to prevent crystallization. Thus, these intermediate fruit products are especially useful as ingredients for frozen or refrigerated foods such as ice creams, sherbets, yogurts and cottage cheese.

F. Drying

The sulfited infused fruit pieces are then desirably dehydrated by any conventional dehydration technique to realize the present dried fruit products. Forced hot air conventional drying is preferred. Such drying is preferably conducted at air temperatures ranging from about 110° F. to 150° F. (43° C. to 65.5° C.) to minimize heat damage and to preserve the fresh fruit color and flavor.

The drying is continued until the desired water activity is obtained. Desired water activity will depend upon a variety of factors such as desired product texture properties and product use or application. Generally, the fruit products are dried to $A_w$'s ranging from about 0.35 to 0.9 and preferably from about 0.5 to 0.7.

It is an advantage of the present invention that drying times are substantially reduced compared to untreated fruits. Drying time reductions of about one half and even up to 90% are obtained by the present invention. Such reductions result from the higher solids content due to sugar(s) infusion of the treated fruit pieces to be dried compared to fresh fruits. Reduced drying requirements provide energy, and drying equipment capitalization costs reductions. Additionally, both flavor and color degradation are reduced due to reductions in drying times since flavor and color constituents are less subject to being driven off or to thermal degradation.

The fruit pieces prepared by the present invention can be used in various ways. For example, the dried fruit pieces can be consumed by themselves as a snack item or in combination with other items, e.g., granola, nuts, etc. The fruit pieces can be added to both dry or instant dry cereals, e.g., oatmeal, which are dry packaged. Preferred embodiments of the dried fruit pieces find particular usefulness as a component of dried, R-T-E cereals and are characterized by an $A_w$ of about 0.5 to 0.6 and a sugar solids concentration prior to final dehydration of about 40% to 60%. If a polyol has been infused into the fruit pieces, the pieces at comparable $A_w$'s will have even lower moisture contents due to displacement of same water by the polyol. With polyol contents of 0.1% to 30% of the fruit pieces, the moisture content can range from about 10% to 15%. In other applications, e.g., baking, if desired, the infused dried fruit pieces can be rehydrated prior to use.

The present dried, infused fruit products have a remarkable extended storage stability while maintaining their desirable texture, color and appearance as compared to non-infused dried fruit products. Still another advantage of the present fruit pieces is that they remain soft even at freezer temperatures.

The R-T-E cereals which the present dried fruit products can be combined include all R-T-E cereal particles in flaked, shredded, expanded, or other forms, such as wheat flakes, corn flakes, shredded wheat, puffed wheat, rice, oat, or corn, bran flakes, whole bran cereal, breakfast cereals in the form of extruded and puffed doughs, and the like. Such cereal particles are prepared in conventional manner and may be either toasted or untoasted.

The following examples are included for illustrative purposes only and are not intended to limit the scope of the invention.

EXAMPLE I

Ten fresh firm ripe D'Anjou pears (2,000 g.) were cored and peeled on a bench-top peeler. The fruits were diced into ¼" cubes and immediately soaked in 1.5 wt. percent sodium sulfite solution for 2-5 minutes. 5000 g. of high fructose corn syrup (72° Brix) were adjusted to pH 2.8 with lemon juice. The syrup was then heated to 165° F. in a temperature controlled bath. The pear dices taken out of the sulfite bath, drained for 10-20 seconds, and were kept submerged in the syrup bath for 45 minutes. The fruit pieces were then taken out of the syrup and dipped in another 1% sodium bisulfite bath having a temperature of 70° F. for 30 seconds to accomplish both the cooling and sulfiting steps. The pear pieces were then dried in a cabinet dryer for 3 hours at 135° F. The final $A_w$ was 0.6.

The dried pieces were blended with Wheaties ® brand toasted wheat flakes, $A_w=0.4$, and stored at 100° F./25% R.H. (relative humidity) for accelerated shelf life storage test. For comparison, 60 g. of toasted wheat flakes were mixed with 15 g. of conventionally prepared dried fruit in foil of comparable $A_w$ triplex material pouches. The fruits retained a soft and chewy texture even after eight weeks of storage. In contrast, the commercially available dry pears were unacceptably hard and tough under identical storage conditions.

EXAMPLE II

Ten pounds (4.53 kg.) of firm ripe apples were sliced through a commercial slicer without peeling. Cores were removed. The slices were immediately dipped in a boiling sugar solution (with 15% soluble solids) for 10 seconds to retard non-enzymatic browning. Commercially available apple juice concentrate was diluted with distilled water from 72° Brix to 58° Brix and the pH adjusted to 3.2 with 2% citric acid solution. 25 lbs. (11.33 kg.) of the juice was heated in a Hotpoint Fryer and maintained at 165° F. The apple slices contained in a screen basket were then kept submerged in the juice concentrate for 30 minutes. During acid hydrolysis the solid content of the apple slices increased from 15.3% to 38.3%. The slices were then dried at 135° F. (57.2° C.) for 1.5 hours until they reached a water activity of 0.7.

The product had a very soft and crisp (fresh fruit-like) texture with strong apple flavor. The product so prepared is useful distributed, refrigerated or frozen (to retard non-enzymatic browning) for uses as all-natural snack, and also as salad topping, dessert, etc. and can be distributed at room temperature, refrigerated, or even frozen.

The dried apple slices were evaluated using a single blade Kramer Shear Cell attached to an Instron ™ brand universal testing machine (Instron Corp., Canton, MA, Model No. 1122). As shown in the table below, conventionally dried commercially available apple slices of the same $A_w$ showed higher resistance to shear, i.e., were tougher pieces.

TABLE

| Product | Shear Force in Kgs. Avg. of 10 Replicates |
| --- | --- |
| Commercial slices | 6.7 |
| Present - fruit pieces | |
| 30 min. cook time | 5.5 |
| 40 min. cook time | 5.1 |
| 50 min. cook time | 4.6 |

EXAMPLE III

Firm ripe whole peaches were peeled by dipping in boiling water and hand rubbing to remove the peels. The peaches were sliced and immediately dipped in a 2% ascorbic acid solution. 500 g. of sucrose was dissolved in 500 ml. of distilled water and the pH adjusted to 2.6 with a combination of sodium citrate and citric acid. 300 g. of peach slices were then kept submerged in the sugar syrup for 30 minutes and the temperature was maintained at 165° F. The fruit pieces were then drained and sulfited for 30 seconds in a 1% sodium bisulfite solution. Drying was accomplished by drying for 3 hours at 135° F. The final $A_w=0.63$.

The product maintained acceptable texture for eight weeks when stored with Wheaties ® brand toasted wheat flakes R-T-E cereal in a foil triplex pouch.

EXAMPLE IV

A whole pineapple was prepared manually to yield dices from the edible portion. Ionex ™ brand pineapple juice concentrate (70° Brix) bath was adjusted to pH 3.2 with a 2% adipic acid solution and heated to 185° F. The pineapple dices were then dipped and kept submerged for 10 minutes. The pineapple pieces were drained and cooled for 30 minutes at room temperature. The pieces were then divided in two batches. One batch was dried to an $A_w$ of 0.5 for compatibility with R-T-E cereals. The second was dried to an $A_w$ of 0.8 to be used as snacks. The dried fruit pieces of the present invention were very soft and slightly chewy at both $A_w$'s.

EXAMPLE V

Firm ripe apricots were peeled by dipping into a 1½% boiling lye solution for 60 seconds followed by thorough washing. The fruits were then sliced and sulfited as in Example IV.

Sixty three D.E. corn syrup was used for the cooking medium, and a 2% citric acid was used to adjust pH to 3.0. The 1,000 g. of apricot slices were cooked in 2,500 g. of the syrup for 45 minutes and the temperature of the mixture was maintained at 160° F. throughout. The sugar infused and cooked fruit slices were then drained, dipped in a 1% sodium sulfite room temperature bath and dried to $A_w$ of 0.6 in a conventional manner. The fruits were judged by a panel as very soft with fresh apricot flavor retained.

EXAMPLE VI

Ten, firm ripe apples were peeled using a hand peeler and cut into halves. To prevent browning, the fruit halves were immediately soaked in 1.5 wt. percent sodium sulfite solution for 2–5 minutes. 1000 gm of Lycasin 80/55 (product of Roguette Corp.), an hydrogenated glucose syrup, were mixed with 4000 gm of high fructose corn syrup (72° Brix) and were adjusted to pH 2.8 with lemon juice. The syrup was then heated to 165° F. in a temperature controlled bath. The apple halves were taken out of the sulfite bath, drained for 10 to 20 seconds and heated in the prepared syrup mix for 45 minutes. The fruit halves were taken out of the syrup and dipped in another 1% sodium sulfite bath having a temperature of 70° F. for 30 seconds to accomplish both the cooling and sulfiting steps. The apple halves were then dried in a tray drier for 10 hours at 155° F. The final $A_w$ was 0.45. The halves were then reduced to flakes or pieces by processing through a grinder.

80 g. of the apple flakes were blended with 400 g. Wheaties ® brand toasted wheat flakes having an initial $A_w$ of 0.4 and the apple flakes maintained their softness even after 12 weeks of storage at 100° F./25% relative humidity.

What is claimed is:

1. A method for preparing shelf stable fruit pieces exhibiting improved flavor, color and texture, comprising the steps in sequence of:
   (A) providing fruit pieces;
   (B) cooking the fruit pieces in a syrup, said syrup consisting essentially of
      (1) sugar or sugars at a concentration of about 30% to 90% by weight of the syrup,
      (2) sufficient acidulants to provide the syrup with a pH of about 3.75 to 1.5, and the syrup having
      (3) a temperature of about 120° F. to 200° F. for about 10 to 60 minutes to form cooked, fruit pieces wherein sugar and acid are infused into the individual cells of the fruit pieces;
   (C) removing the fruit pieces from the syrup; and
   (D) cooling the infused fruit pieces to below their gelling point to form a gel within and between the cells of the fruit.

2. The method of claim 1 wherein the pieces of fruit are prepared from fresh fruit and wherein the fruit is selected from the group consisting of apples, pears, cherries, apricots, pineapple, peaches, plums, and mixtures thereof.

3. The method of claim 2 further comprising the step of
   (E) dehydrating the fruit pieces.

4. The method of claim 3 wherein the fruit pieces are dehydrated to an $A_w$ of about 0.35 to 0.9.

5. The method of claim 4 wherein the sugar component of the syrup comprises fruit juice or juice powders.

6. The method of claim 5 wherein the syrup comprises an acidifying fruit juice selected from the group consisting of lemon juice, lime juice, vinegar, apple cider, and mixtures thereof.

7. The method of claim 6 further comprising the step, immediately after step A of inactivating browning enzymes of the fruit pieces.

8. The method of claim 4 wherein the pH is about 2 to 3.6 and wherein the fruit pieces are dried to an $A_w$ of 0.5 to 0.7.

9. The product produced by the method of claim 1.

10. The product produced by the method of claim 8, and wherein the sugar solids range from about 40% to 60% by weight of the fruit piece.

11. The product produced by the method of claim 10 wherein the cereal is a ready-to-eat breakfast cereal.

12. The product of claim 11 further comprising from about 99% to 50% of dry ready-to-eat breakfast cereal.

13. The method of claim 4 wherein the sugar syrup additionally comprises from about 0.1% to 30% by weight of an edible polyhydric alcohol or sugar alcohol.

14. The method of claim 13 wherein the sugar syrup comprises from about 15% to 25% by weight of an edible polyhydric alcohol selected from the group consisting of mannitol, sorbitol, glycerol, propylene glycol and mixtures thereof.

15. The method of claim 14 wherein the edible polyhydric alcohol is glycerol.

16. The product produced by the method of claim 13.
17. The product produced by the method of claim 14.
18. The product produced by the method of claim 15.
19. The product produced by the method of claim 4.
20. The product produced by the method of claim 5.
21. The product produced by the method of claim 6.

* * * * *

UNITED STATES PATENT AND TRADEMARK OFFICE
CERTIFICATE OF CORRECTION

PATENT NO. : 4,542,033
DATED : Sep. 17, 1985
INVENTOR(S) : Om P. Agarwala

It is certified that error appears in the above-identified patent and that said Letters Patent are hereby corrected as shown below:

On the first page, Assignee is omitted. Should read:

-- Assignee: General Mills, Inc., Minneapolis, MN --

Signed and Sealed this

Sixth Day of May 1986

[SEAL]

Attest:

DONALD J. QUIGG

Attesting Officer

Commissioner of Patents and Trademarks